United States Patent
Epstein et al.

(10) Patent No.: US 7,475,015 B2
(45) Date of Patent: Jan. 6, 2009

(54) SEMANTIC LANGUAGE MODELING AND CONFIDENCE MEASUREMENT

(75) Inventors: Mark E. Epstein, Katonah, NY (US); Hakan Erdogan, Istanbul (TR); Yuqing Gao, Mount Kisco, NY (US); Michael A. Picheny, White Plains, NY (US); Ruhi Sarikaya, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 10/655,838

(22) Filed: Sep. 5, 2003

(65) Prior Publication Data

US 2005/0055209 A1 Mar. 10, 2005

(51) Int. Cl.
*G10L 15/00* (2006.01)
(52) U.S. Cl. .......................... 704/257; 704/9; 704/231; 704/4; 704/8; 704/255
(58) Field of Classification Search ............. 704/4, 704/257, 266
See application file for complete search history.

(56) References Cited

U.S. PATENT DOCUMENTS

| | | | |
|---|---|---|---|
| 6,556,964 B2 * | 4/2003 | Haug et al. | 704/9 |
| 6,596,031 B1 * | 7/2003 | Parks | 715/202 |
| 2002/0087316 A1 * | 7/2002 | Lee et al. | 704/257 |
| 2003/0216905 A1 * | 11/2003 | Chelba et al. | 704/9 |
| 2005/0055199 A1 * | 3/2005 | Ryzchachkin et al. | 704/4 |

OTHER PUBLICATIONS

Adwait Ratnaparkhi, Learning to Parse Natural Language with Maximum Entropy Models, Machine Learning, v.34 n. 1-3, p. 151-175, Feb. 1999.*
Ruben San-Segundo et al.; Confidence Measures for Spoken Dialogue Systems; Center for Spoken Language Research, University of Colorado, Boulder, CO; 4 pages.
Rong Zhang and Alexander I. Rudnicky; Word Level Confidence Annotation Using Combinations of Features; School of Computer Science, Pittsburgh, PA; Eurospeech 2001—Scandinavia; 4 pages.
P. Carpenter, C. Jin, D. Wilson, R. Zhang, D. Bohus, A. Rudnicky; Is This Conversation on Track?; School of Computer Science, Pittsburgh, PA; Eurospeech 2001—Scandinavia; 4 pages.
C. Pao, P. Schmid, J. Glass; Confidence Scoring for Speech Understanding Systems; Spoken Language Systems Group; MA Institute of Technology; Cambridge, MA; 4 pages.
F. Wessel, K. Macherey, H. Ney; A Comparison of Word Graph and N-Best List Based Confidence Measures; Lehrstuhl fur Informatik VI, RWTH Aachen—Univ. of Techn. Aachen Germany; 4 pages.

(Continued)

*Primary Examiner*—Richemond Dorvil
*Assistant Examiner*—Natalie Lennox
(74) *Attorney, Agent, or Firm*—Keusey, Tutunjian & Bitetto, P.C.; Anne V. Dougherty, Esq.

(57) ABSTRACT

A system and method for speech recognition includes generating a set of likely hypotheses in recognizing speech, rescoring the likely hypotheses by using semantic content by employing semantic structured language models, and scoring parse trees to identify a best sentence according to the sentence's parse tree by employing the semantic structured language models to clarify the recognized speech.

20 Claims, 4 Drawing Sheets

OTHER PUBLICATIONS

Hokan Erdogan et al., Semantic Structured Language Models; ICSLP 2002; Sep. 16, 2002; pp. 933-936.

Ruhi Sarikaya et al., Word Level Confidence Measurement Using Semantic Features; Proc. of IEEE ICASSP2003; vol. 1; Apr. 6, 2003; pp. I604-I607.

Nobuo Nukaga et al., Incremental Speech Understanding using Hierarchically Structured Semantic Network; Technical report of IEICE, vol. 93, No. 426; SP93-116; pp. 63-70 (in Japanese—Abtract Translation included).

* cited by examiner

SEMANTIC LANGUAGE MODELING AND CONFIDENCE MEASUREMENT

BACKGROUND

1. Field of Exemplary Embodiments

Aspects of the invention relate to language modeling, and more particularly to systems and methods which use semantic parse trees for language modeling and confidence measurement.

2. Description of the Related Art

Large vocabulary continuous speech recognition (LVCSR) often employs statistical language modeling techniques to improve recognition performance. Language modeling provides an estimate for the probability of a word sequence (or sentence) P(w1 w2 w3 ... wN) in a language or a subdomain of a language. A prominent method in statistical language modeling is n-gram language modeling, which is based on estimating the sentence probability by combining probabilities of each word in the context of previous n−1 words.

Although n-gram language models achieve a certain level of performance, they are not optimal. N-grams do not model the long-range dependencies, semantic and syntactic structure of a sentence accurately.

A related problem to modeling semantic information in a sentence is the confidence measurement based on semantic analysis. As the speech recognition output will always be subject to some level of uncertainty, it may be vital to employ some measure that indicates the reliability of the correctness of the hypothesized words. The majority of approaches to confidence annotation methods use two basic steps: (1) generate as many features as possible based on speech recognition and/or a natural language understanding process, (2) use a classifier to combine these features in a reasonable way.

There are a number of overlapping speech recognition based features that are exploited in many studies (see e.g., R. San-Segundo, B. Pellom, K. Hacioglu and W. Ward, "Confidence Measures for Spoken Dialog Systems", ICASSP-2001, pp. 393-396, Salt Lake City, Utah, May 2001; R. Zhang and A. Rudnicky, "Word Level Confidence Annotation Using Combination of Features", Eurospeech-2001, Aalborg, Denmark, September, 2002; and C. Pao, P. Schmid and J. Glass, "Confidence Scoring for Speech Understanding Systems", ICSLP-98, Sydney, Australia, December 1998). For domain independent large vocabulary speech recognition systems, posterior probability based on a word graph is shown to be the single most useful confidence feature (see, F. Wessel, K. Macherey and H. Ney, "A Comparison of Word Graph and N-best List Based Confidence Measures", pp.1587-1590, ICASSP-2000, Istanbul, Turkey, June 2000). Semantic information can be considered as an additional information source complementing speech recognition information. In many, if not all, of the previous studies the way the semantic information is incorporated into the decision process is rather ad hoc. For example in C. Pao et al., "Confidence Scoring for Speech Understanding Systems", referenced above, the semantic weights assigned to words are based on heuristics. Similarly, in P. Carpenter, C. Jin, D. Wilson, R. Zhang, D. Bohus and A. Rudnicky, "Is This Conversation on Track", Eurospeech-2001, pp. 2121-2124, Aalborg, Denmark, September 2001, such semantic features as "uncovered word percentage", "gap number", "slot number", etc. are generated experimentally in an effort to incorporate semantic information into the confidence metric.

SUMMARY

A system and method for speech recognition, includes a unified language model including a semantic language model and a lexical language model. A recognition engine finds a parse tree to analyze a word group using the lexical model and the semantic models. The parse tree is selected based on lexical information and semantic information, which considers tags, labels, and extensions to recognize speech.

Preferred methods may be integrated into a speech recognition engine or applied to lattices or N-best lists generated by speech recognition.

A method for speech recognition includes generating a set of likely hypotheses in recognizing speech, rescoring the likely hypotheses by using semantic content by employing semantic structured language models, and scoring parse trees to identify a best sentence according to the sentence's parse tree by employing the semantic structured language models to clarify the recognized speech.

In other embodiments, the step of determining a confidence measurement is included. The confidence measurement determination may include includes employing a statistical method to combine word sequences with a parser tree to determine a confidence score for recognized speech. This may include determining the confidence measurement by employing scores obtained from the semantic structured language models along with other speech recognition based features. The scores may be obtained by extracting probabilities assigned to tags, labels and extensions obtained from a parser tree. The step of combining the semantic structured language models and speech recognition based features with the extracted probabilities using a classifier may be included These and other objects, features and advantages of the present exemplary systems and methods will become apparent from the following detailed description of illustrative embodiments thereof, which is to be read in connection with the accompanying drawings.

BRIEF DESCRIPTION OF DRAWINGS

The exemplary embodiments will be described in detail in the following description of preferred embodiments with reference to the following figures wherein.

DETAILED DESCRIPTION OF PREFERRED EMBODIMENTS

The present disclosure provides a system and method, which incorporates semantic information in a semantic parse tree into language modeling. The semantic structured language modeling (SSLM) methods may employ varying levels of lexical and semantic information using any of the statistical learning techniques including, for example, maximum entropy modeling, decision trees, neural networks, support vector machines or simple counts. In one embodiment, maximum entropy modeling is used. This embodiment will be employed as an illustrative example herein.

In accordance with this disclosure, a set of methods is based on semantic analysis of sentences. These techniques utilize information extracted from parsed sentences to statistically model semantic and lexical content of the sentences. A maximum entropy method is employed, for example, to rescore N-best speech recognizer hypotheses using semantic features in addition to lexical features.

The maximum entropy method (MEM) may be used for language modeling in the context of n-grams, sentence-based statistical language modeling and syntactic structured language models. However, an exemplary embodiment of the present disclosure employs MEM to incorporate semantic features into a unified language model. This integration enables one to easily use semantic features in language modeling. Semantic features can be obtained from a statistical parser as well as from a stochastic recursive transition network (SRTN). These features encode information related to the semantic interpretation of each word and word groups, which is one important consideration to distinguish meaningful word sequences from less meaningful or meaningless ones.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces.

Figure 1:
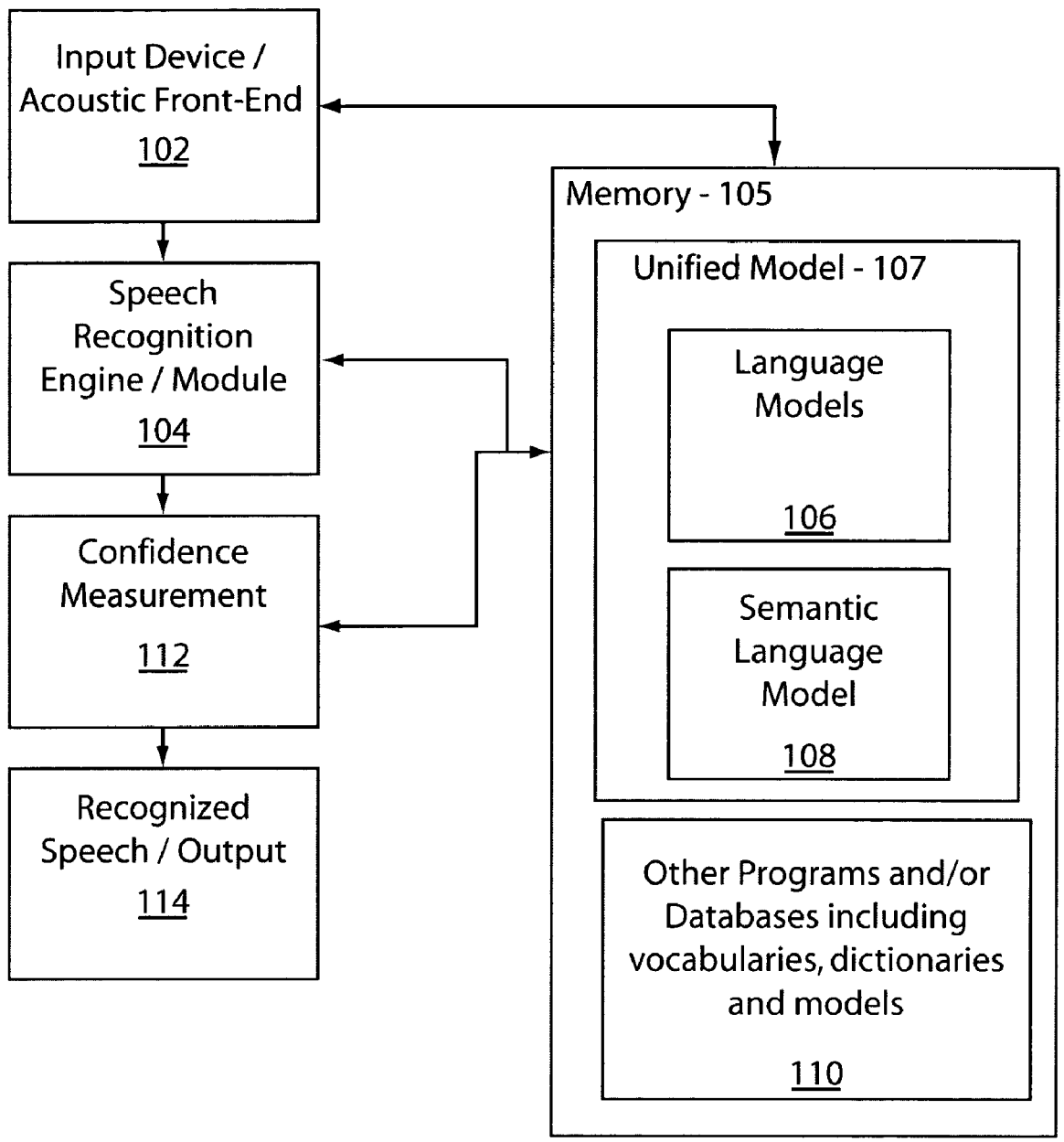
FIG. 1 is a block diagram showing a speech recognition and confidence measurement system in accordance with the present disclosure.

Referring now to the drawings in which like numerals represent the same or similar elements and initially to FIG. 1, a system 100 for carrying out one embodiment is shown. System 100 may include a computer device or network, which provides speech recognition capabilities. System 100 may be employed to train speech recognition models or may be employed as a speech recognition system or speech analyzer. System 100 may include an input device for inputting text or speech to be recognized. Input device 102 may include a microphone, a keyboard, a mouse, a touch screen display, a disk drive or any other input device. Inputs to input device 102 may include semantic information, which can be stored in memory 105. This semantic information may be employed to construct semantic language models 108 in accordance with the present disclosure.

Semantic information is employed in a semantic parse tree to be used in language modeling. The semantic structured language modeling (SSLM) methods or programs stored in language models 106 and semantic language model 108 may employ varying levels of lexical and semantic information using any of the statistical learning techniques including, for example, maximum entropy modeling, decision trees, neural networks, support vector machines or simple counts. This method may be carried out be employing a speech recognition engine or engines 104.

Speech recognition module 104 processes acoustic input, digital signals, text or other input information to recognize speech or organize the input to create language models 106, semantic language models 108 or other programs or databases 110, such as vocabularies, dictionaries, other language models or data, etc. Engine 104 may provide speech recognition capabilities for system 100 by employing any known speech recognition methods.

In accordance with this disclosure, engine 104 also employs a set of methods based on semantic analysis of sentences to enhance the speech recognition capabilities of system 100. These techniques utilize information extracted from parsed sentences to statistically model semantic and lexical content of the sentences. A maximum entropy method is employed, for example, to rescore N-best speech recognizer hypotheses using semantic features in addition to lexical features.

The maximum entropy method (MEM) may be used for language modeling in the context of n-grams, sentence-based statistical language modeling and syntactic structured language models. MEM is illustratively employed as an exemplary embodiment in the present disclosure to incorporate semantic features into a unified language model 107. This integration enables easy usage of semantic features in language modeling. Semantic features can be obtained from a statistical parser as well as from a stochastic recursive transition network (SRTN), which may be incorporated in module 104.

These parsing features encode information related to the semantic interpretation of each word and word groups, which is one important consideration to distinguish meaningful word sequences from less meaningful or meaningless ones.

Semantic information may include one or more of word choice, order of words, proximity to other related words, idiomatic expressions or any other information based word, tag, label, extension or token history.

This semantic information is employed to develop language modeling by training a model 108 based on the semantic information available. These models may include the following illustrative semantic structured language models (SSLM).

MELM1 (Maximum Entropy Method 1) preferably uses unigram, bigram and trigram features. It is possible to use more intelligent features that will capture a longer range and higher-level information. Considering data sparsity and computation requirements, the following sublist of context question types for individual token probability computations may be employed (see MELM2).

MELM2 (Maximum Entropy Method 2) uses longer-range semantic features, for example, 7 types of features:
Unigram: (default question)
bigram: previous word $w_{j-1}$ (ignore label tokens)
trigram: two previous words $w_{j-1}$ and $w_{j-2}$ (ignore label tokens)
Current active parent label Li (parent constituent label)
Ni (number of tokens to the left since current L starts)
Oi (previous closed constituent label)
Mi (number of tokens to the left after Oi finishes)
7 types of questions: (default), ($w_{j-1}$), ($w_{j-1}$, $w_{j-2}$), (Li), (Li, Ni), (Li, Ni, $w_{j-1}$), (Oi, Mi)

Note that, these are the questions are chosen for the maximum entropy (ME) model. There may be many other possible features that utilize other information such as tags, grandparent labels etc. The choices could be dependent on the domain or the type of semantic parsing employed. The maximum entropy framework enables one to incorporate any type of features as long as they are computable.

The model 108 is employed to calculate word probabilities to decipher probabilities that particular word sequences or phrases have been employed.

Figure 2:
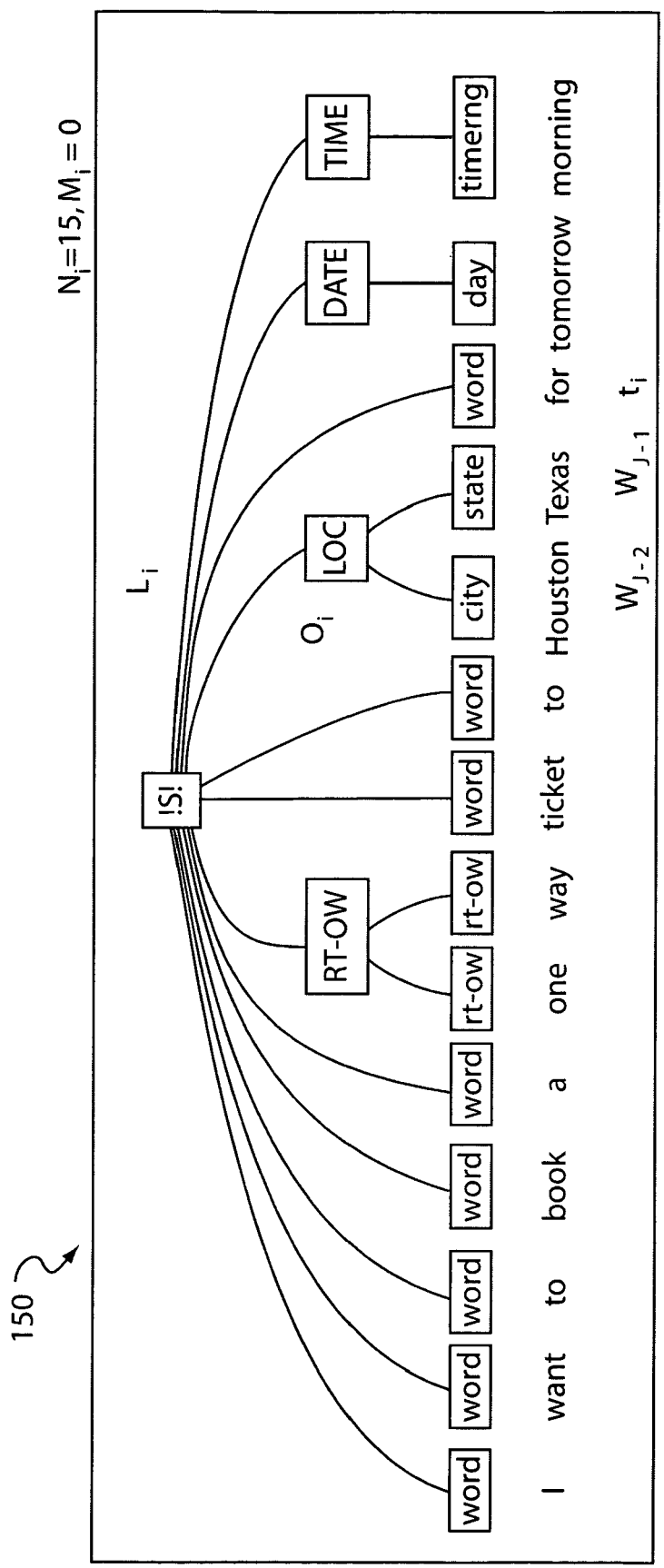
FIG. 2 is a diagram showing an illustrative parse tree employed to recognize speech and further shows information (e.g., $w_{j-2}$, $w_{j-1}$, $L_i$, $O_i$, $N_i$ and $M_i$) obtained from the parse tree to build a semantic language model in accordance with the present disclosure.

Referring to FIG. 2, an example application of MELM2 to compute P(ti=for| history) is presented as a parser tree.

The probability of the token sequence, [!S! I want to book a [RT-OW one way RT-OW] ticket to [LOC Houston Tex. LOC] for [DATE tomorrow DATE] [TIME morning TIME] is equivalent to joint probability of a classer tree and the word sequence given as the following equation:

$$P(W,C) \approx \Pi_{ni=1} P(t_i | t_1, \ldots, t_{i-3}, t_{i-2}, t_{i-1})$$

Where a token t can be a word, label, tag, etc.

Another SSLM includes MELM3 (Maximum Entropy Method 3), which combines semantic classer and parser and uses a full parse tree 150. The full parse tree 150 presents a complete semantic structure of the sentence where, in addition to classer information, such as RT-OW (round-trip one way), LOC (location), DATE, TIME, semantic relationships between the constituents are also derived, e.g., wj−2, wj−1, $t_i$. The following features are used to train a Maximum Entropy based statistical model:

7 history parameters of MELM3
wj−1: previous word wj−1 (ignore label tokens)
wj−2: previous word of previous word (ignore label tokens)
L: (parent constituent label)
N: (number of tokens to the left since L starts)
O: (previous closed constituent label)
M: (number of tokens to the left after O finishes)
G: (grandparent label)
6 history question types: (default), (wj−1), (wj−1, wj−2), (L,N), (O,M), (L,G)

Although the trees that the questions are based on are different, MELM2 and MELM3 share similar questions. Indeed, only the fifth question of MELM3 is not included in the MELM2 question set. Note that even though these specific question sets are selected for MELM2 and MELM3, any question based on classer and parser trees can be a legitimate choice in Maximum Entropy modeling.

The inventors experimentally determined that these question sets performed adequately in training a language model. Inclusion of additional questions did not significantly improve the performance for the illustratively described task.

The set of semantic language modeling techniques, MELM1, MELM2 and MELM3 improve speech recognition accuracy. In addition, features derived from these language models can be used for confidence measurement by employing confidence measurement module 112 (FIG. 1).

Module 112 uses the language model score for a given word in MELM2 model, which is conditioned not only on previous words but also tags, labels and relative coverage of these labels over words. Tags define the types of words regarding their semantic content. For example, the tag assigned to Houston is "city". Words that are not semantically important are assigned a "null" tag. Labels are used to categorize a word or word group into one of the concepts. The number of labels is less than the number of tags. An extension or arc is the connection between a tag assigned to a word and the label. Relative coverage refers to how far the current word is from the beginning of the current label.

MELM2 presents an effective statistical method to combine word sequences with a semantic parse tree. Therefore, the MELM2 score, for example, may be used as a feature for confidence measurement. However, MELM2 for a given word only depends on the previous word sequence and the parse tree up to that word. A low score can be expected for the current word if the previous word is recognized incorrectly. Besides the MELM2 score for the current word wi, a window of three words ([w{i−1} wi w{i+1}]), MELM2-ctx3, were considered and five words, MELM2-ctx5, centered on the current word to capture the context information. The same features can be derived for MELM3 as well.

Figure 3:
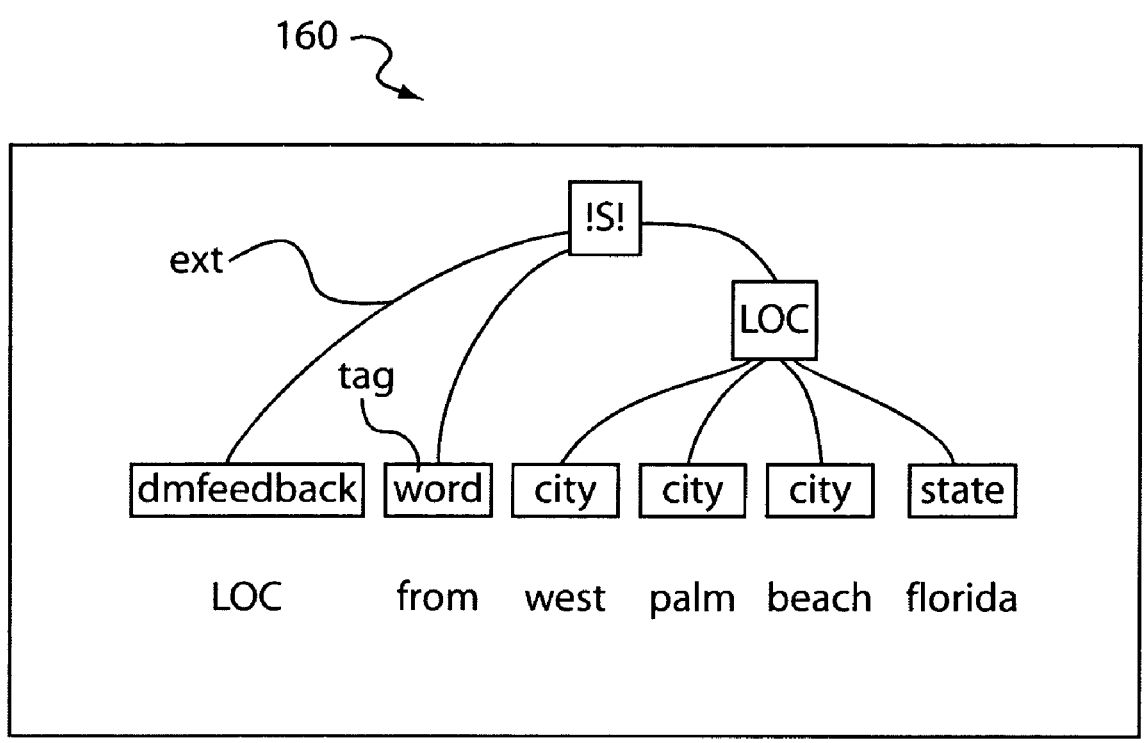
FIG. 3 is a diagram showing an illustrative classer tree with probabilities assigned employed to provide confidence scores in accordance with the present disclosure.

Referring to FIG. 3 with continued reference to FIG. 1), probabilities obtained by module 104 from semantic parse trees stored in model 108 can also be used for confidence measurement in module 112. The classer/parser performs a left-to-right bottom-up search to find the best parse tree for a given sentence. During the search, each tag node (tag), label node (e.g., LOC) and extension (ext) in the parse tree is assigned a probability. Similarly, an extension probability represents the probability of placing that extension between the current node and its parent node given the "context". When the parser is conducting the search both lexical (from model 106) and the semantic clues (from model 108) are used to generate the best parser action.

The degree of confidence while assigning the tag and the label feature values is reflected in the associated probabilities. If the word does not "fit" in the current lexical and semantic context, its tag and labels are likely to be assigned low probabilities. Therefore, using these probabilities as features in the confidence measurement is a viable way to capture the semantics of a sentence. Below is the classer tree for the phrase "from West Palm Beach Fla.". The corresponding classer tree is shown in FIG. 3. cTag (shown as "tag" in FIG. 3) and cTagExt (shown as "ext" in FIG. 3) are classer tag and tag extension probabilities, respectively. Likewise in a parser tree, as opposed to a classer tree, "arc" and "ext" would correspond to pTag and pTagExt, which are parser tag and tag extension probabilities, respectively.

A classer tree 160 is shown in FIG. 3 along with its text representation. Each token has a pair of probabilities.

{0.502155 {!S!__1__1:LOC_dmfeedback__1__0.997937 from_word__0.99371__0.995734 {LOC__0.999976__ 0.998174 west_city__0.635543__0.894638 palm_city__ 0.998609__0.981378 beach_city__0.998609__0.957721 florida_state__0.96017__0.995701 LOC__0.999976__ 0.998174} !S!__1__1}}

Confidence measurements by module 112 are optional, but can greatly improve speech recognition accuracy, which is output in block 114. Output 114 may be customized to any form. For example, output 114 may be speech synthesized and acoustically rendered, textually render, transmitted as an analog or digital signal, etc.

The following are some specific examples where SSLM corrects errors committed by regular n-gram methods. These examples were run by the inventors to show the advantages of the present embodiment using MEM. Confidence scores are also given below to show improvements.

| | |
|---|---|
| Reference (Ref): | new horizons and and blue chip |
| n-gram: | log is an end blue chip |
| sslm: | horizons and and blue chip |
| Ref: | what is my balance by money type |
| n-gram: | what was the of my money sent |
| sslm: | what is my balance by money take |
| Ref: | change pin |
| n-gram: | change plan |
| sslm: | change pin |

The following are some specific examples where errors committed by posterior probability features are corrected by the semantic confidence features. The threshold for confidence is set to 0.87, which roughly corresponds to 5% False Acceptance rate for both posterior probability (post) and sslm+post (sslm and posterior probability). These examples are correctly accepted by sslm+post features but falsely rejected by the post features alone:

| Ref: | balance |
|---|---|
| Hypothesis (Hyp): | balance |
| Post: | 0.54 (confidence measure) |
| Post + sslm: | 0.95 (confidence measure) |
| Ref: | summary |
| Hyp: | summary |
| Post: | 0.63 (confidence measure) |
| Post + sslm: | 0.93 (confidence measure) |
| Ref: | plan |
| Hyp: | plan |
| Post: | 0.79 (confidence measure) |
| Post + sslm: | 0.88 (confidence measure) |

The following examples are correctly rejected by sslm+post features but falsely accepted with post features alone:

| Ref: | call |
|---|---|
| Hyp: | <SIL> |
| post_conf: | 0.88 (confidence measure) |
| post + sslm: | 0.04 (confidence measure) |
| Ref: | — |
| Hyp: | have |
| post_conf: | 0.93 (confidence measure) |
| post + sslm: | 0.82 (confidence measure) |
| Ref: | representative |
| Hyp: | rep |
| post_conf: | 0.88 (confidence measure) |
| post + sslm: | 0.70 (confidence measure) |

Figure 4:
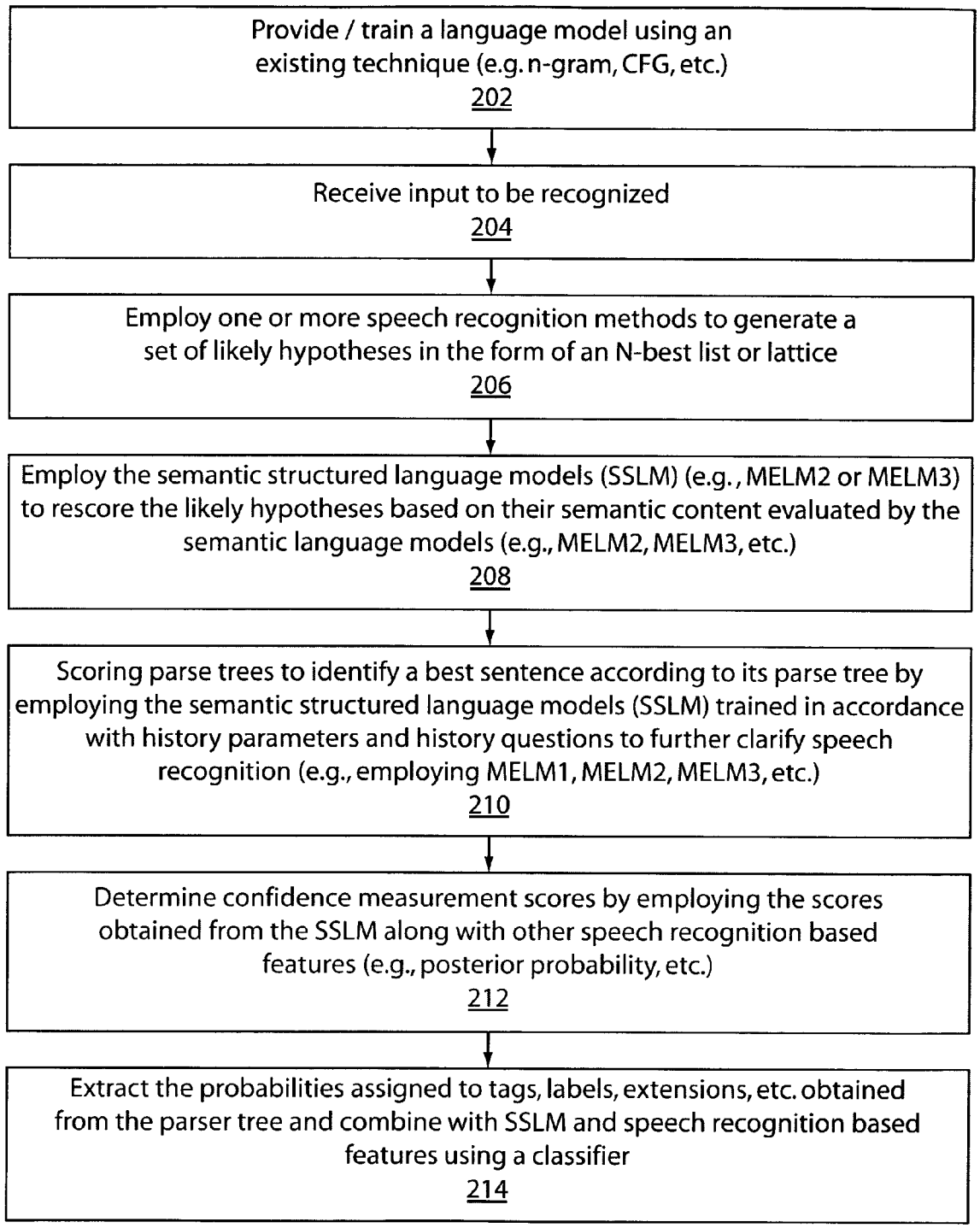
FIG. 4 is a block/flow diagram showing a speech recognition and confidence measurement method in accordance with the present disclosure.

Referring to FIG. 4, a method for speech recognition includes providing or training a language model in block 202. The language model may be trained using known training techniques, such as n-gram, CFG, etc. In block 204, input to be recognized is received. The input may be in any form permitted by the speech recognition method or device. In block 206, one or more speech recognition methods may be employed to generate a set of likely hypotheses. The hypotheses are preferably in the form of an N-best list or lattice structure.

In block 208, semantic structured language models (SSLM) are employed to rescore the likely hypotheses based on the semantic content of the hypotheses. This is performed by evaluating the hypothesis using the SSLM models, e.g., MELM2 or MELM3, etc. In block 210, parse trees are scored to identify a best sentence in accordance with its parse tree. This is performed by using SSLMs trained in accordance with history parameters and history questions to further clarify the speech recognized.

The history parameters may include a previous word (wj−1), a previous word of the previous word (wj−2), a parent constituent label (L), a number of tokens (N) to the left since L starts, a previous closed constituent label (O), a number of tokens (M) to the left after O finishes, and a grandparent label (G). The history questions may include a default, (wj−1), (wj−1, wj−2), (L,N), (O,M), and (L,G).

In block 212, a confidence measurement or score may be determined by employing the scores obtained from the SSLM along with other speech recognition based features, e.g., posterior probability, etc. In block 214 probabilities assigned to tags, labels, extensions, etc. obtained from the parser tree may be combined with SSLM and speech recognition based features using a classifer. These probabilities may be employed to further improve speech recognition by increasing the level of confidence in confidence scores.

Having described preferred embodiments for semantic language modeling and confidence measurement (which are intended to be illustrative and not limiting), it is noted that modifications and variations can be made by persons skilled in the art in light of the above teachings. It is therefore to be understood that changes may be made in the particular embodiments disclosed which are within the scope and spirit of the present disclosure as outlined by the appended claims. Having thus described the exemplary embodiments with the details and particularity required by the patent laws, what is claimed and desired protected by Letters Patent is set forth in the appended claims.

What is claimed is:

1. A method for speech recognition, comprising the steps of:
generating a set of likely hypotheses using a speech recognition method for recognizing speech;
rescoring the likely hypotheses by using sentence based semantic content and lexical content by employing a semantic structured language model which combines a semantic language model and a lexical language model wherein the semantic structured language model is trained by including a unigram feature, a bigram feature, a trigram feature, a current active parent label (Li), a number of tokens (Ni) to the left since current parent label (Li) starts, a previous closed constituent label (Oi), a number of tokens (Mi) to the left after the previous closed constituent label finishes, and a number of questions to classify parser tree entries, wherein the questions include a default, (wj−1), (wj−1, wj−2), (Li), (Li, Ni, wj−1), and (Oi, Mi), where w represents a word and j is and index representing word position; and
scoring parse trees to identify a best sentence according to the sentences' parse tree by employing semantic information and lexical information in the parse tree to clarify the recognized speech.

2. The method as recited in claim 1, further comprising the step of training a language model using speech recognition methods.

3. The method as recited in claim 1, wherein the set of likely hypotheses is in the form of an N-best list or lattice.

4. The method as recited in claim 1, wherein the step of rescoring employs maximum entropy method 2 (MELM2) or maximum entropy method 3 (MELM3) semantic structured language models.

5. The method as recited in claim 1, further comprising the step of determining a confidence measurement.

6. The method as recited in claim 5, wherein the step of determining a confidence measurement includes employing a statistical method to combine word sequences with a parser tree to determine a confidence score for recognized speech.

7. The method as recited in claim 5, wherein the step of determining a confidence measurement includes employing scores obtained from the semantic structured language model along with other speech recognition based features.

8. The method as recited in claim 1, further comprising the step of extracting probabilities assigned to tags, labels and extensions obtained from a parser tree.

9. The method as recited in claim 8, further comprising the step of combining the semantic structured language model and speech recognition based features with the extracted probabilities.

10. A program storage medium readable by machine, tangibly embodying a program of instructions executable by the machine and stored on the medium to perform method steps for speech recognition, in accordance with claim 1.

11. A system for speech recognition, comprising:
- a speech recognition engine configured to generate a set of likely hypotheses using a speech recognition method for recognizing speech;
- a unified language model including a semantic language model and a lexical language model configured for rescoring the likely hypotheses to improve recognition results by using sentence-based semantic content and lexical content wherein the unified language model is trained by including a unigram feature, a bigram feature, a trigram feature, a current active parent label (Li), a number of tokens (Ni) to the left since current parent label (Li) starts, a previous closed constituent label (Oi), a number of tokens (Mi) to the left after the previous closed constituent label finishes, and a number of questions to classify parser tree entries, wherein the questions include a default, (wj−1), (wj−1, wj−2), (Li), (Li, Ni), (Li,Ni, wj−1), and (Oi,Mi), where w represents a word and j is and index representing word position to compute word probabilities; and
- the speech recognition engine configured to score parse trees to identify a best sentence according to the sentences' parse tree by employing semantic information and lexical information in the parse tree to clarify the recognized speech.

12. The system as recited in claim 11, wherein the parser tree includes semantic information and classer information used in identifying a best parser tree for a given word group.

13. The system as recited in claim 11, wherein the parser tree includes information extracted from parsed sentences to statistically model semantic and lexical content of sentences.

14. The system as recited in claim 11, wherein the semantic language model includes one or more of relative labels, token numbers, and answers to questions related to word order or placement.

15. The system as recited in claim 11, wherein the questions include a default, (wj−1), (wj−1, wj−2), (Li), (Li, Ni), (Li, Ni, wj−1), and (Oi, Mi), where w represents a word and j is and index representing word position.

16. The system as recited in claim 11, wherein the semantic model is trained by including history parameters and history questions wherein the history parameters include a previous word (wj−1), a previous word of the previous word (wj−2), a parent constituent label (L), a number of tokens (N) to the left since L starts, a previous closed constituent label (O), a number of tokens (M) to the left after O finishes, and a grandparent label (G).

17. The system as recited in claim 16, wherein the history questions include a default, (wj−1), (wj−1, wj−2), (L,N), (O,M), and (L,G).

18. The system as recited in claim 11, further comprising a confidence measurement module.

19. The system as recited in claim 18, wherein the confidence measurement module employs a statistical method to combine word sequences wit the parse tree to determine a confidence score for recognized speech.

20. The system as recited in claim 18, wherein the confidence measurement module extracts probabilities assigned to tag nodes, label nodes and extensions in the parse tree.

* * * * *